O. B. BULLARD.
STALK PULLER.
APPLICATION FILED SEPT. 11, 1918.
1,297,319.
Patented Mar. 18, 1919.
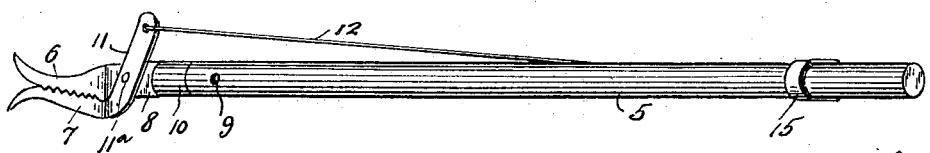
Fig. 1.
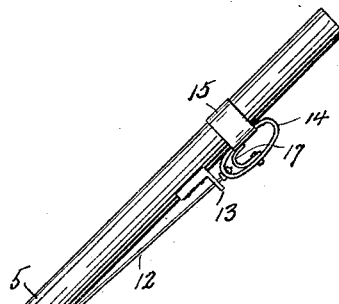
Fig. 2.
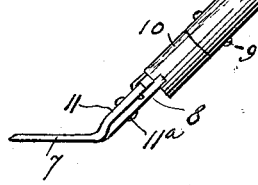
Fig. 3.
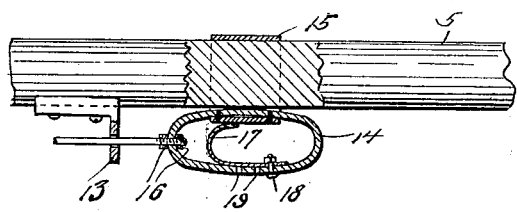
Inventor
Otto B. Bullard
By
Attorneys.

UNITED STATES PATENT OFFICE.

OTTO B. BULLARD, OF SPALDING, NEBRASKA.

STALK-PULLER.

1,297,319.  Specification of Letters Patent.  Patented Mar. 18, 1919.

Application filed September 11, 1918. Serial No. 253,600.

*To all whom it may concern:*

Be it known that I, OTTO B. BULLARD, a citizen of the United States, residing at Spalding, in the county of Greeley and State of Nebraska, have invented new and useful Improvements in Stalk-Pullers, of which the following is a specification.

This invention relates to hand implements for pulling bean stalks and other plants out of the ground, and its object is to provide a simple, efficient and easily operated device of this kind.

The object stated is attained by means of a novel combination and arrangement of parts to be hereinafter described and claimed, and in order that the same may be better understood, reference is had to the accompanying drawings forming a part of this specification.

In the drawing,

Figure 1 is a plan view of the implement;

Fig. 2 is a side elevation thereof, and

Fig. 3 is a sectional detail of an operating device.

Referring specifically to the drawing, 5 denotes the handle of the implement, the same being made of wood and having a suitable length. The outer end of the handle carries a pair of jaws 6 and 7 for grasping the plants or stalks to be pulled out of the ground.

The jaw 6 has a shank 8 by which it is secured to the handle 5 by a bolt 9 and a ferrule 10, or in any other suitable manner.

The jaw 7 has a laterally extending lever arm 11 at its inner end which crosses the shank 8 and is pivoted thereto by a rivet or bolt 11ᵃ. The jaw 7 is therefore pivoted, and the jaw 6 is stationary.

To the outer end of the lever arm 11 is connected an operating rod 12 extending rearward along the handle 5 and passing loosely through an upstanding guide 13 carried by the latter. Back of this guide, the rod is connected to a hand grip which is slidably mounted on the handle. This hand grip is in the form of a loop 14 to which is riveted or otherwise secured a sleeve 15 which loosely passes around the handle so that it may slide freely along the same. The forward end of the loop 14 has an aperture through which the rear end of the rod 12 passes and in which it is held by nuts 16.

Inside the loop 14, back of the point where the rod 12 is made fast, is a guard comprising a curved plate 17 extending between the top and bottom of the loop. This guard plate is fastened to the top of the loop by a bolt 18, and by providing the loop with a series of bolt holes 19, the plate may be set forward or rearward in the loop to adjust the same to the hand.

The jaws 6 and 7 are flat and their inner edges are serrated to obtain a firm grip on the stalks and thereby prevent slippage. It will also be noted that the jaws are flared or slightly divergent at their outer ends to facilitate the entry of the stalks therebetween.

The shank 8 extends straight forward from the handle 5 in longitudinal alinement therewith, but its jaw 6, as well as the jaw 7, extends at an oblique angle to the longitudinal axis of the handle, which enables the operator to place the jaws flat on and close to the ground without tilting the handle 5 to an inconvenient and unhandy position. The implement can thereby be operated with ease and rapidity, and it effectually serves the purpose for which it is designed.

I claim:

1. A stalk puller comprising a handle, a stationary jaw attached to the outer end of the handle, a jaw opposite the stationary jaw and having a laterally extending lever arm at its inner end crossing the shank of the stationary jaw and pivoted thereto, an operating rod connected to the lever arm, a looped hand grip slidably connected to the handle and connected to the rear end of the rod, and a guard plate inside the hand grip.

2. A stalk puller comprising a handle, a stationary jaw attached to the outer end of the handle, a jaw opposite the stationary jaw and having a laterally extending lever arm at its inner end crossing the shank of the stationary jaw and pivoted thereto, an operating rod connected to the lever arm, a looped hand grip slidably connected to the handle and connected to the rear end of the rod, and a guard plate inside the hand grip and adjustable in the direction of the length thereof.

In testimony whereof I affix my signature.

OTTO B. BULLARD.

Copies of this patent may be obtained for five cents each, by addressing the "Commissioner of Patents, Washington, D. C."